US009818436B2

United States Patent
Shimazawa et al.

(10) Patent No.: US 9,818,436 B2
(45) Date of Patent: Nov. 14, 2017

(54) THERMAL ASSISTED MAGNETIC RECORDING HEAD WITH PLASMON GENERATOR

(71) Applicant: TDK Corporation, Tokyo (JP)

(72) Inventors: Koji Shimazawa, Tokyo (JP); Shuji Okame, Tokyo (JP); Yoshihiro Tsuchiya, Tokyo (JP); Takafumi Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/084,956

(22) Filed: Mar. 30, 2016

(65) Prior Publication Data

US 2017/0287513 A1  Oct. 5, 2017

(51) Int. Cl.
  G11B 5/127  (2006.01)
  G11B 5/39   (2006.01)
  G11B 5/48   (2006.01)
  G11B 5/31   (2006.01)
  G11B 5/187  (2006.01)
  G11B 5/00   (2006.01)
  G11B 5/012  (2006.01)
  G11B 5/60   (2006.01)

(52) U.S. Cl.
  CPC ............ *G11B 5/3929* (2013.01); *G11B 5/127* (2013.01); *G11B 5/187* (2013.01); *G11B 5/313* (2013.01); *G11B 5/314* (2013.01); *G11B 5/3133* (2013.01); *G11B 5/4826* (2013.01); *G11B 5/4833* (2013.01); *G11B 5/012* (2013.01); *G11B 5/6088* (2013.01); *G11B 2005/0021* (2013.01)

(58) Field of Classification Search
  None
  See application file for complete search history.

(56) References Cited

U.S. PATENT DOCUMENTS

| 8,904,514 B2 | 12/2014 | Jenne et al. |
| 9,129,620 B2 | 9/2015 | Cheng et al. |
| 2014/0376352 A1 | 12/2014 | Cheng et al. |
| 2016/0275972 A1* | 9/2016 | Zhao ............... G11B 5/314 |

OTHER PUBLICATIONS

Junichi Koike et al., "Role of Interface Adhesion Strength in Interconnection Reliability" Journal of The Surface Science Society of Japan, 2007, pp. 67-71, vol. 28, No. 2.
K. E. Haq et al., "Adhesion Mechanism of Gold-Underlayer Film Combinations to Oxide Substrates" Journal of Vacuum Science and Technology, 1969, pp. 148-152, vol. 6, Issue 1.

* cited by examiner

*Primary Examiner* — Brian Butcher
(74) *Attorney, Agent, or Firm* — Posz Law Group, PLC (57) ABSTRACT

A thermal assisted magnetic recording head that performs magnetic recording while locally heating a magnetic recording medium includes: a plasmon generator that generates a surface plasmon and that generates near-field light from the surface plasmon on a front end surface positioned on an air bearing surface opposing the magnetic recording medium; a dielectric body layer positioned around the plasmon generator; and an adhesion layer positioned between the plasmon generator and the dielectric body layer. The adhesion layer is made from at least one of IrOx, RuOx, NiOx and CoOx.

10 Claims, 9 Drawing Sheets

Adhesion layer

Fig. 6B

Adhesion layer

THERMAL ASSISTED MAGNETIC RECORDING HEAD WITH PLASMON GENERATOR

BACKGROUND OF THE INVENTION

1. Field of the Invention

The present invention relates to a thermal assisted magnetic recording head with a plasmon generator.

2. Description of the Related Art

Recently, in a magnetic recording apparatus typified by a magnetic disk apparatus, there has been a need for performance improvement of a thin film magnetic head and a magnetic recording medium in association with high recording density. As the thin film magnetic head, a composite type thin film magnetic head is widely used in which a reproducing head having a magnetoresistive effect element (MR element) for reading, and a recording head having an induction-type electromagnetic transducer element for writing, are laminated on a substrate.

The magnetic recording medium is a discontinuous medium in which magnetic grains are aggregated, each magnetic grain has a single magnetic domain structure. Each recording bit on the magnetic recording medium is configured with a plurality of magnetic grains. In order to enhance the recording density, the unevenness of a boundary between recording bits that are adjacent to each other has to be smaller, and the magnetic grains have to be reduced in size for this purpose. However, small magnetic grains, i.e., magnetic grains with small volumes, cause a reduction in thermal stability of magnetization. In order to solve this problem, it is effective to increase anisotropy energy of the magnetic grains. However, high anisotropy energy of magnetic grains enhances a coercive force of the magnetic recording medium, and makes it difficult to record information with an existing magnetic head.

As a method for solving this problem, a so-called thermal assisted magnetic recording is proposed. In this method, a magnetic recording medium with greater coercive force can be used. When information is recorded, a magnetic field and heat are simultaneously added to a portion in the magnetic recording medium where information is recorded, and temperature of the portion is increased. Information is recorded to the portion where the coercive force has been decreased with this process, by the magnetic field. Hereafter, a magnetic head that is used in the thermal assisted magnetic recording is referred to as a thermal assisted magnetic recording head (TAMR head).

A typical TAMR head includes a core that propagates light irradiated from a laser diode and a plasmon generator that generates near-field light (NF light). The plasmon generator is coupled with portion of a propagation light that propagates in the core in a surface plasmon mode and generates a surface plasmon, allows the surface plasmon to propagate up to a front end surface positioned on an air bearing surface, and generates the NF light on the front end surface.

In the existing TAMR head, deterioration of recording properties (such as an S/N ratio) in association with continuous recording occurs. Agglomeration of the front end surface of the plasmon generator is recognized as a main factor. Agglomeration is a phenomenon where metal atoms are gathered, and occurs as a result of dispersion or movement of the metal atoms using heat and stress as a driving force. Asperities exist on the air bearing surface of a magnetic head slider and a surface of the magnetic recording medium, and the front end surface of the plasmon generator may contact the magnetic recording medium while the magnetic recording apparatus is in operation. Temperature increase and stress increase due to the impact that occurs at this time causes agglomeration. The agglomeration easily causes the front end surface of the plasmon generator to recess from the air bearing surface. As a result, the distance between the plasmon generator and the magnetic recording medium is increased, and the capability to heat the magnetic recording medium is decreased over time, which causes deterioration of the S/N ratio. Therefore, it is desired to suppress agglomeration of the plasmon generators to ensure the reliability of the TAMR head.

One option to suppress agglomeration considers improvement of hardness by adding 0.2 at % to 2.0 at % of element, such as copper (Cu) or iron (Fe), to gold (Au), which is suitable for a material of the plasmon generator, for creating an alloy (U.S. Pat. No. 8,964,514). However, an alloy, such as AuCu or AuFe, is poor in a propagation efficiency of the surface plasmon, and propagation loss of the plasmon is great in a plasmon propagation region of the plasmon generator, and causes heat generation. As a result, reliability is reduced. Therefore, even though suppression of the recess of the front end surface of the plasmon generator from the air bearing surface is realized, the problem of heat generation due to a propagation loss of the plasmon occurs.

In the meantime, in U.S. Pat. No. 9,129,620, a technology to form a metal layer, an oxide layer, a nitride layer, a carbide layer or the like as an adhesion layer on a front end surface of a peg of the plasmon generator positioned on the air bearing surface is disclosed. Thus, if the adhesion layer is arranged in the vicinity of the air bearing surface, agglomeration of Au configuring the plasmon generator is suppressed. However, if specifically a metallic adhesion layer is arranged on the air bearing surface, it is not preferable because it prevents collection of light and generation of strong NF light by Au. However, an oxide layer is preferable because loss is small and it has minimal negative effect on the collection of light and generation of strong NF light by Au. However, BeO, SiO, FeO, ZrO, MnO, CdO, MgO and HfO, which are oxide layers disclosed in this publication, have insufficient adhesion with Au, and the suppression of agglomeration is poor.

Non-Patent Literature "Surface Science, Vol. 28, No. 2, pp. 67 to 71, 2007," discloses a technology in the semiconductor field to provide an adhesion layer, such as Ta or Cr, on an interface between a Cu wiring and a dielectric body (SiOx or SiNx) surrounding the Cu wiring in order to enhance resistance to electromigration of the Cu wiring. However, if the adhesion layer, such as Ta or Cr, is provided in the plasmon generator of the TAMR head, oxygen that transmits a protective film of the head oxidizes Ta or Cr configuring the adhesion layer on the polished air bearing surface, and there is the problem that the adhesiveness will be reduced. Such a problem of adhesion reduction due to oxidation is also disclosed in Non-Patent Literature "Electromigration Reliability Study of Submicron Cu Interconnections," authored by C-K Hu., R. Rosenberg, W. Klaasen, A. K. Stamper, which begins on page 691".

The objective of the present invention is to provide a thermal assisted magnetic recording head that can generate a narrowed-down near-field light and that causes minimal agglomeration of the plasmon generators on the front end surface.

SUMMARY OF THE INVENTION

The thermal assisted magnetic recording head of the present invention that performs magnetic recording while a magnetic recording medium is locally heated includes: a plasmon generator that generates a surface plasmon, and that generates a near-field light (NF light) from the surface plasmon on the front end surface positioned on an air bearing surface opposite to the magnetic recording medium; a dielectric body layer positioned around the plasmon generator, and an adhesion layer that is positioned between the plasmon generator and the dielectric body layer; and the adhesion layer is composed of at least one of IrOx, RuOx, NiOx and CoOx. Here, IrOx, RuOx, NiOx and CoOx are defined as an oxide with any composition of Ir, Ru, Ni and Co.

The adhesion layer is an oxide, while excellent adhesiveness with a dielectric body (for example, AlOx or SiOx) surrounding the NF light generating element in the thermal assisted magnetic recording head is maintained, and it has excellent adhesiveness with the Au-based plasmon generator. Due to those characteristics, the plasmon generator and the dielectric body are solidly adhered to one another, and movement of atomic vacancies on the surface of the plasmon generator (interface with the dielectric body) is suppressed, and agglomeration of the plasmon generators is minimized.

Further to the objective above, other objectives, characteristics and advantages of the present invention will be clear from the description below with reference to the attached drawings where the present invention is exemplified.

DETAILED DESCRIPTION OF THE INVENTION

Figure 1:
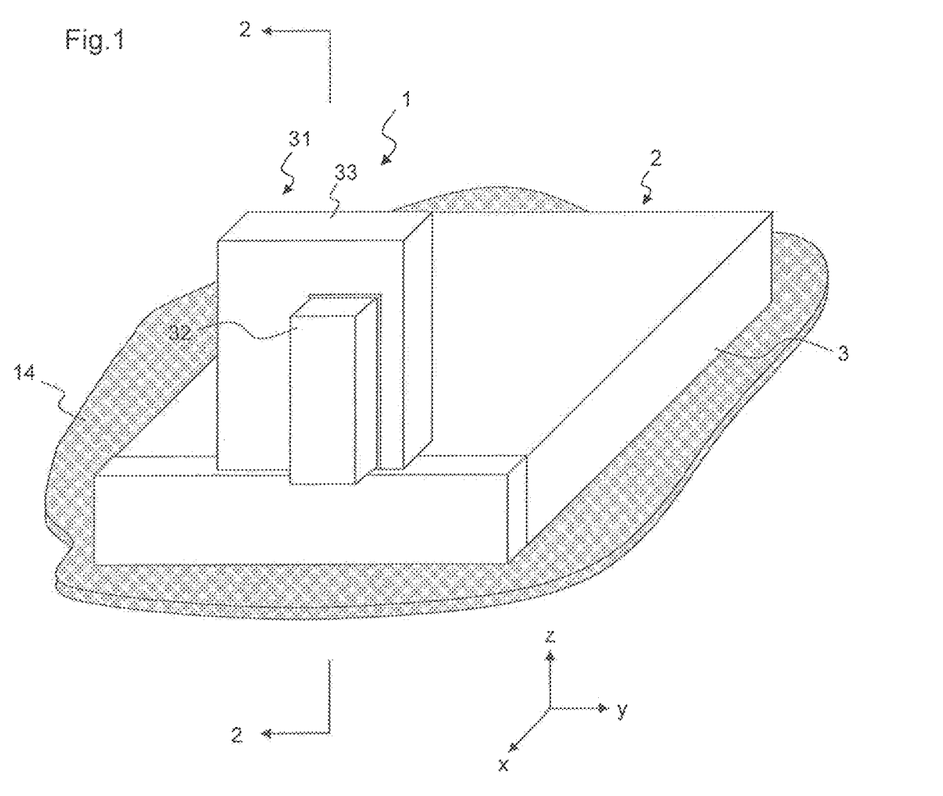
FIG. 1 is an overall perspective view of a thermal assisted magnetic recording head.
Figure 2:
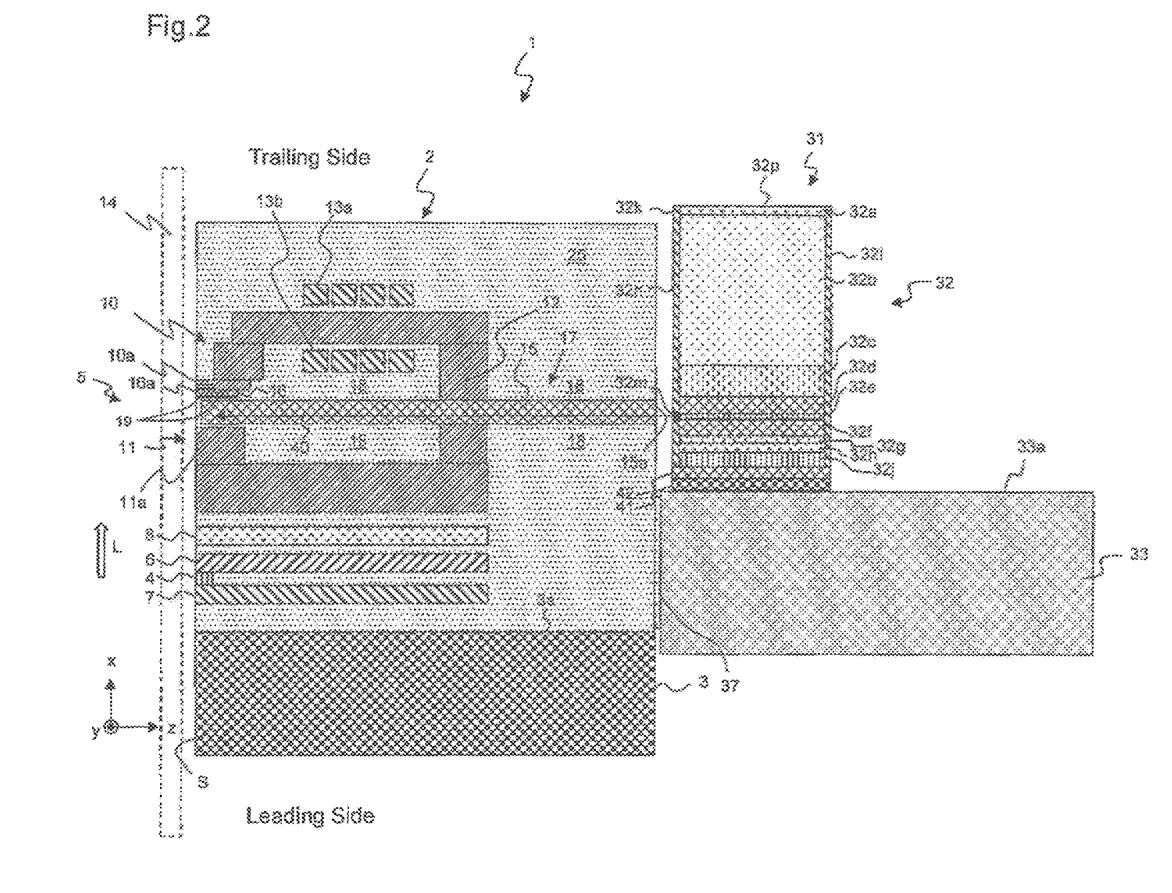
FIG. 2 is a conceptual cross-sectional view of a thermal assisted magnetic recording head relating to one embodiment of the present invention.

First, a configuration of a thermal assisted magnetic recording head relating to one embodiment of the present invention is explained. FIG. 1 is an overall perspective view of a thermal assisted magnetic recording head. FIG. 2 is a conceptual cross-sectional view of the thermal assisted magnetic recording head along the line 2-2 in FIG. 1.

In the present specification, the x direction means a down track direction corresponding to a circumferential direction of the magnetic recording medium, and a direction that is orthogonal to an integrated surface 3a of a substrate 3 where a magnetoresistive (MR) element, a magnetic recording element or the like is formed. The y direction means a cross track direction corresponding to a radial direction of a magnetic recording medium. The z direction means a direction that is orthogonal to an air bearing surface S of a magnetic head slider. The x direction matches a film formation direction L in a wafer process. The x direction, the y direction and the z direction are orthogonal to each other. "Upper side" and "lower side" mean a direction away from a substrate and a direction toward a substrate relative to the x direction, respectively. "Trailing side" and "leading side" may be used instead of "upper side" and "lower side", respectively.

A magnetic head 1 has a magnetic head slider 2 and a laser diode unit 31 that is fixed to the magnetic head slider 2 and that emits laser light.

The magnetic head slider 2 has a nearly hexahedral shape, and one surface configures the air bearing surface S opposite from a magnetic recording medium 14. The magnetic head slider 2 has a MR element 4, a magnetic recording element 5, a waveguide path 17 that is equipped with a core 15 where laser light emitted from the laser diode unit 31 can propagate as propagation light, and a plasmon generator 16 that generates near-field light (NF light) on the air bearing surface S from the propagation light. These elements are formed on the substrate 3 made from AlTiC ($Al_2O_3$—TiC).

The magnetic recording element 5 has a main pole 10 for perpendicular magnetic recording extending to the air bearing surface S. The main pole 10 is provided adjacent to the plasmon generator 16. A portion of the main pole 10 protrudes on the leading side, and makes contact with the plasmon generator 16. Thereby, heat generation of the plasmon generator 16 can be radiated to the main pole 10. A main pole end surface 10a, which is an end portion of the main pole 10, is positioned on the air bearing surface S, and generates a magnetic field for recording on the air bearing surface S. A leading shield 11 is provided at the leading side of the main pole 10 in the x direction (down track direction). The leading shield 11 is magnetically linked with the main pole 10 via a contact part 12 and configures an integral magnetic circuit along with the main pole 10. The leading shield 11 has a shield end surface 11a positioned on the air bearing surface S. Coils 13a and 13b are wound centering the contact part 12 around the main pole 10. The main pole 10, the leading shield 11 and the contact part 12 are formed with an alloy containing two or three of Ni, Fe and Co or the like. An overcoat layer 25 made from $Al_2O_3$ is provided above the magnetic recording element 5 in the x direction.

A magnetic flux generated inside the main pole 10 is emitted from the main pole end surface 10a toward a magnetic recording medium 14 as a magnetic flux for writing. The magnetic flux emitted from the main pole end surface 10a enters into the magnetic recording medium 14, and each recording bit is magnetized in a perpendicular direction (z direction). The magnetic flux changes its magnetic path to an in-plane direction (x direction) of the magnetic recording medium 14, changes its orientation to a perpendicular direction (z direction) again in the vicinity of the leading shield 11, and is absorbed by the leading shield 11 from the shield end surface 11a.

The magnetic head slider 2 has a waveguide path 17 that can propagate a laser light. The waveguide path 17 is positioned closer to the leading side in the down track direction x than the plasmon generator 16. The waveguide path 17 has a core 15 extending in the z direction and a clad 18 covering the core 15. The core 15 propagates the laser light generated at the laser diode unit 31 in the z direction as a propagation light 40. The core 15 extends from an end part 15a (incident end surface of laser light) opposite to the laser diode unit 31 of the magnetic head slider 2 to the vicinity of the air bearing surface S. A cross section of the core 15 that is orthogonal to the propagation direction (z direction) of the propagation light 40 is rectangular, and the width (dimension in the y direction) is greater than the thickness (dimension in the x direction). The core 15 can be formed, for example, with TaOx. TaOx refers to tantalum oxide with any composition, and $Ta_2O_5$, TaO, $TaO_2$, TaOx and the like are typical, but it is not limited to these. The core 15 is covered with the clad 18 with a smaller refractive index than the core 15. The clad 18 can be formed with a dielectric body, such as SiOx or AlOx. Furthermore, SiOx and AlOx mean an oxide with any composition of Si and Al, and $SiO_2$ and $Al_2O_3$ are typical, but such oxide is not limited to these.

The magnetic head slider 2 has the MR element 4 where its front end part is positioned on the air bearing surface S and an upper shield layer 6 and a lower shield layer 7 placed at both sides of the MR element 4 in the x direction. The MR element 4 is a reproducing element that reads information recorded in the magnetic recording medium, and it can be any of a Current-In-Plane (CIP)-Gigantic Magnetoresistive (GMR) element in which a sense current flows in the y direction, a Current-Perpendicular-to-Plane (CPP)-GMR element in which a sense current flows in the x direction and a Tunneling Magnetoresistive (TMR) element in which a sense current flows in the x direction utilizing a tunnel effect. If the MR element 4 is the CPP-GMR element or the TMR element, the upper shield layer 6 and the lower shield layer 7 are utilized as an electrode that supplies a sense current, as well. A magnetic shield layer 8 is provided between the MR element 4 and the magnetic recording element 5.

Figure 3:
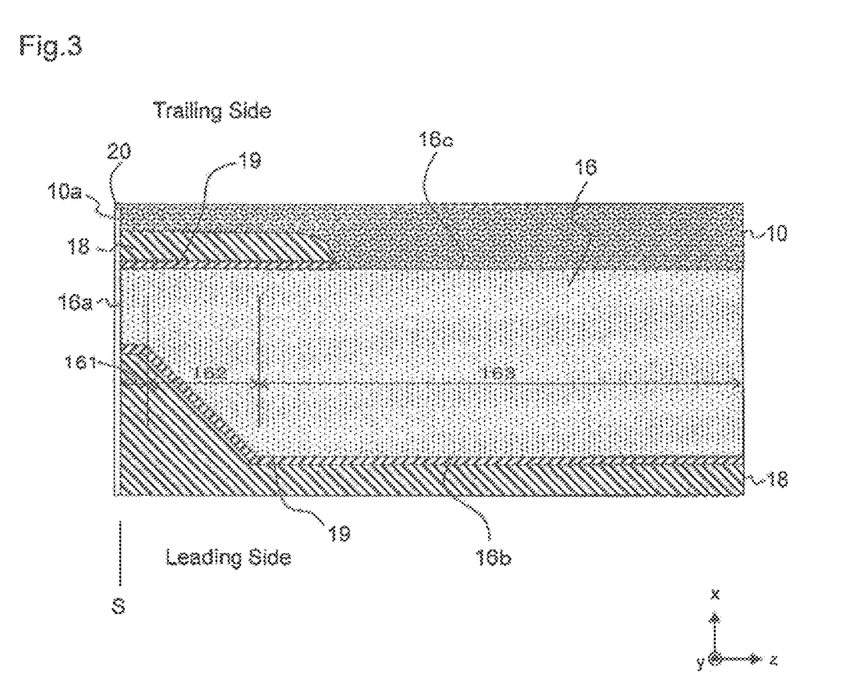
FIG. 3 is an enlarged view of a main portion in FIG. 2.

The magnetic head slider 2 has the plasmon generator 16 that generates a near-field light (NF light) on the air bearing surface S from the propagation light 40. The plasmon generator 16 is a pillar metal piece extending in a height direction z. As shown in FIG. 3, the plasmon generator 16 has a front end portion 161 with dimensions that are tapered both in the down track direction x and the cross track direction y, a main part 163 that has a greater dimension in the down track direction than the front end portion and where its dimension in the cross track direction y is gradually increased along the height direction z, and a transition part 162 positioned between the front end portion 161 and the main part 163. A surface 16c of the plasmon generator 16 at the trailing side extends in parallel with the height direction z, and a surface 16b at the leading side is formed in a step configuration.

The plasmon generator 16 includes the front end surface 16a positioned on the air bearding surface S. The front end surface 16a has a trapezoidal shape where its leading side is a longer side and its trailing side is a shorter side, but it may be shaped as a rectangle, square, triangle or the like. A main pole end surface 10a is positioned in the vicinity of the front end surface 16a.

Out of surfaces extending in the height direction z of the plasmon generator 16, the surface at the leading side configures a propagation surface 16b opposite to the core 15. The propagation surface 16b of the main part 163 is coupled with the propagating light 40 that propagates through the core 15 in the surface plasmon mode, and generates the surface plasmon. The surface plasmon propagates on the propagating surface 16b up to the front end surface 16a, and generates near-field light (NF light) on the front end surface 16a. Thereby, the plasmon generator 16 heats a portion of the magnetic recording medium 14 where information will be recorded.

The plasmon generator 16 can be formed with Au- or AuCo-based metal, and is preferably made from Au or AuCO having 99.0% or greater purity. However, a minute amount (for example, approximately 1%) of Rh may be contained.

An adhesion layer 19 is provided between the plasmon generator 16 and the clad 18 made from a dielectric body, such as $SiO_2$ or $Al_2O_3$. The adhesion layer 19 is a metal oxide layer, and is made from one or a plurality of layers of IrOx, RuOx, NiOx and CoOx. The technical significance of this adhesion layer 19 is explained below.

As described above, agglomeration of the front end surface 16a of the plasmon generator 16 becomes a problem. Agglomeration is caused by movement of metal atoms and atomic vacancies within the metal. Specifically, the metal atoms within the metal move using heat and/or stress as a driving force and are collected, and the atomic vacancies moves so as to switch places with the metal atoms. The atomic vacancies exists within the metal coming from a deficit of atoms at a crystal lattice point, and aggregation of the atomic vacancies forms a void causing agglomeration. The atomic vacancies has a characteristic to move to an environment with high stress and high temperature. Since the front end surface 16a of the plasmon generator 16 has high stress and is at high temperature due to collision against the magnetic recording medium 14 or narrowing of the NF light, the atomic vacancies easily moves toward the front end surface 16a of the plasmon generator 16. In other words, the atomic vacancies tends to move toward the front end surface 16a within the plasmon generator 16, and the metal atoms tend to move in a direction away (receding) from the front end surface 16a. The atomic vacancies that has moved to the front end surface 16a is aggregated to form a void, and the front end surface 16a where the void has been formed is recessed to a position receded from the air bearing surface S. As a result, since the NF light is generated at the position recessed from the air bearing surface S, a possibility that the magnetic recording medium 14 cannot be sufficiently heated is increased. Even if this distance to be recessed is only several nanometers, this greatly impacts on the heating capability of the magnetic recording medium 14.

In the present invention, in order to suppress the movement of the atomic vacancies causing agglomeration, the adhesion layer 19 is provided between the plasmon generator 16 and the clad 18. Since atomic vacancies normally moves actively on a surface rather than inside of a metal, movement of atomic vacancies on the surface of the plasmon generator 16 is suppressed by improving the adhesiveness between the surface of the plasmon generator 16 and the clad 18 contacting the surface, and movement of atomic vacancies in the entire plasmon generator 16 can be drastically suppressed. A large amount of atomic vacancies will not be collected on the front end surface 16a of the plasmon generator 16 by reducing the movement of the atomic vacancies, and a large void will not be formed. This suppresses agglomeration of the plasmon generator 16 on the front end surface 16a, and a distance of the front end surface 16a to be recessed becomes smaller.

Thus, the adhesion layer 19 that suppresses agglomeration of the plasmon generator 16 requires to be solidly attached to Au or AuCo, which is a main component of the plasmon generator 16, and AlOx or SiOx, which is a dielectric body configuring the clad 18, respectively, so as to prevent movement of the atomic vacancies. Further, it is preferable to enable collection of light and generation of strong NF light by Au: therefore, it is preferable that the adhesion layer 19 will not absorb any light (having translucency). Taking these conditions into consideration, the adhesion layer 19 is preferably any of an IrOx layer, a RuOx layer, a NiOx layer and a CoOx layer, and can have a multilayered structure containing these.

A method for forming the adhesion layer 19 is briefly explained. As one example of the method for forming the adhesion layer 19, radio-frequency (RF) sputtering using various oxide targets is exemplified. In this case, sputtering can be implemented under an environment only with a noble gas, such as Ar or Kr, or it may be implemented under an environment where oxygen is mixed into such noble gas. Further, an adhesion layer may be formed with a reactive sputtering using various metal targets. In this case, oxygen is mixed into a noble gas, such as Ar or Kr, and sputtering is conducted. In addition, various metals are formed to have approximately 1 nm or less of thickness by sputtering, and then the adhesion layer can be formed with oxidation treatment. The oxidation treatment is conducted by being exposed to oxygen plasma, oxygen radical or oxygen atom.

It is preferable that the adhesion layer 19 is thermally treated. This is performed by heating at 200° C. or higher after the adhesion layer 19 and the plasmon generator 16 are formed by lamination and before polishing processing of the head.

Figure 4A:
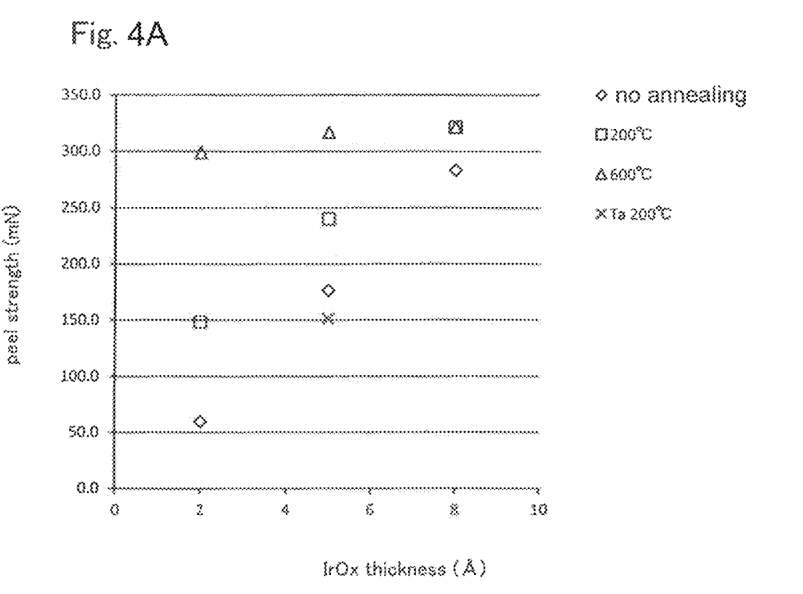
FIGS. 4A to 4C are graphs showing relationships between heat treatment conditions, materials of adhesion layer, film thickness and peel strength.
Figure 4B:
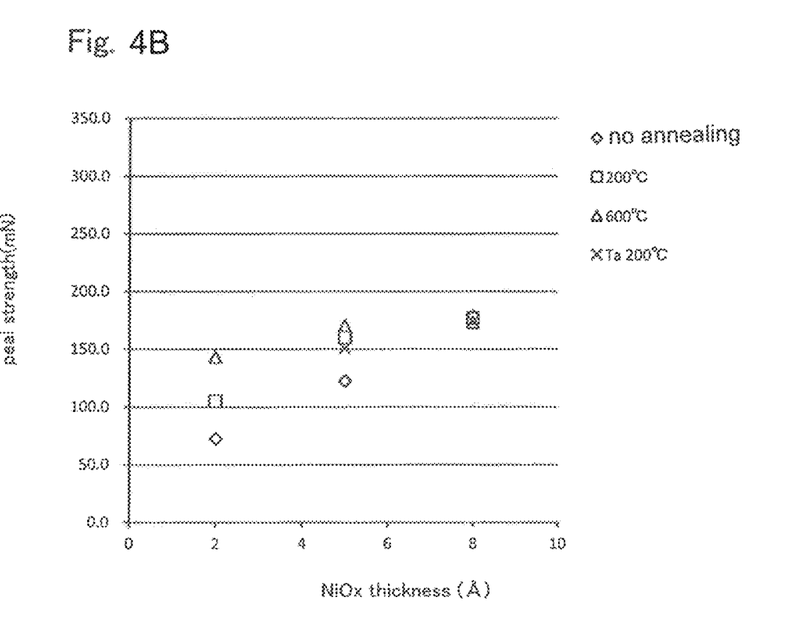
Figure 4C:
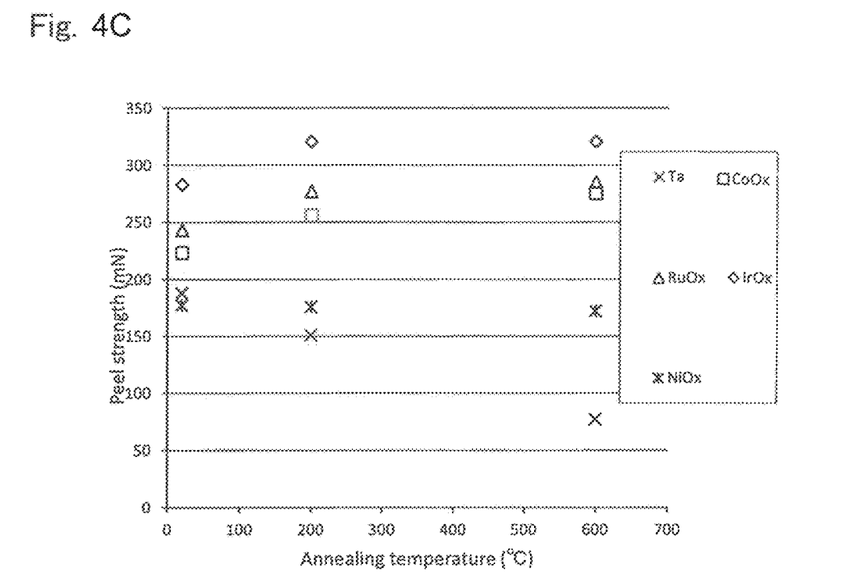

Regarding this point, more specific experimental examples are shown in FIGS. 4A to 4C. FIG. 4A shows a relationship between film thickness and peel strength in comparative examples (1) without heat treatment, (2) with heat treatment at 200° C., (3) with heat treatment at 600° C. and (4) with formation of a Ta layer instead of the adhesion layer 19 and heat treatment at 200° C., using IrOx as the adhesion layer 19 on the surface of the plasmon generator 16 made from Au with 500 Å of thickness. Similarly, FIG. 4B shows a relationship between film thickness and peel strength in comparative examples (1) without heat treatment, (2) with heat treatment at 200° C., (3) with heat treatment at 600° C. and (4) with formation of a Ta layer instead of the adhesion layer 19 and heat treatment at 200° C., using NiOx as the adhesion layer 19. In addition, FIG. 4C shows a relationship between heat treatment, film thickness and peel strength in the case of using the adhesion layer 19 of IrOx, RuOx, NiOx or CoOx and Ta (8 Å of film thickness of each layer). According to these graphs, it becomes ascertained that the peel strength becomes greater with the heat treatment, and the higher the heat treatment temperature becomes, the greater the peel strength becomes, except for NiOx. Then, even though effects vary depending upon materials of the adhesion layer 19, it becomes ascertained that the adhesion layer 19 with IrOx, RuOx, NiOx or CoOx is effective for improvement of the peel strength, i.e., improvement of adhesion. In addition, it becomes ascertained that the improvement of the peel strength is remarkable, especially when the film thickness of the adhesion layer is 5 Å or greater.

Figure 5:
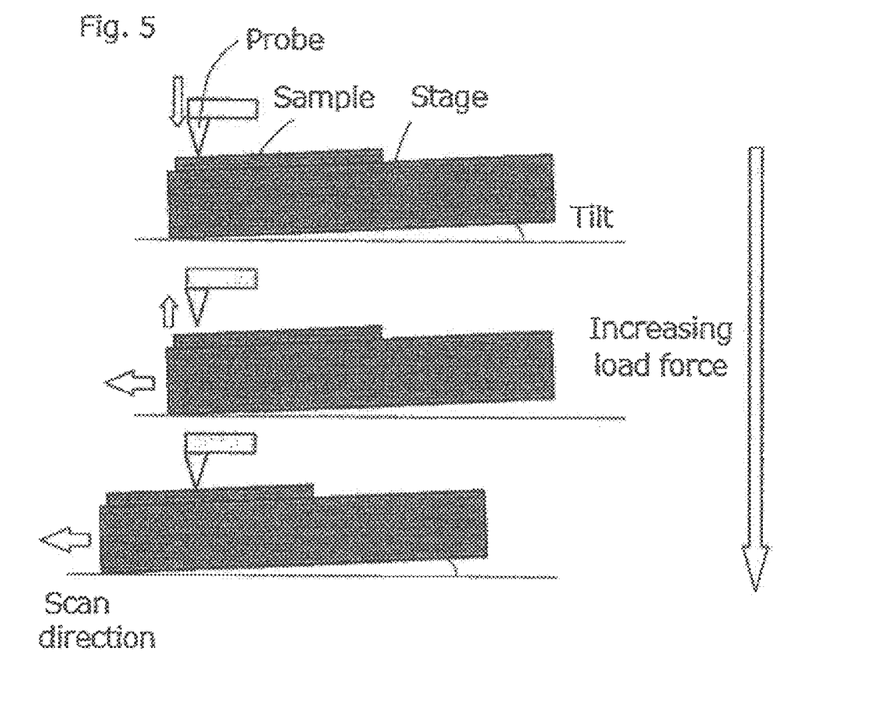
FIG. 5 is a pattern diagram showing a method for measuring the peel strength.

Furthermore, the peel strength was measured by arranging samples having the adhesion layer on the tilted stage as shown in FIG. 5, and by horizontally moving the stage while a load was increased under a condition where a sharp probe was in contact with the samples in order to apply the load. After this measurement was conducted for a certain period of time (for example, for 5 minutes), scratches on surfaces of the samples were checked and evaluated with an optical microscope.

It is preferable that the plasmon generator 16 is made from Au with 99.0% or greater purity. This is because it has been experimentally confirmed that an element(s) mixed in Au is precipitated on the interface between the plasmon generator 16 and the adhesion layer 19 if the purity is low, and the adhesiveness is deteriorated. Regarding this point, Table 1 shows the peel strength in the case of providing IrOx with 8 Å of thickness as the adhesion layer 19 on the surface of the plasmon generator 16 made from AuRh with 500 Å of thickness. The purpose to add Rh is to improve stress resistance via improvement of hardness of the plasmon generator 16. It becomes ascertained that the peel strength is drastically reduced if an additive amount of Rh in AuRh becomes 1% or greater. Consequently, if Rh is added in order to improve the hardness and the stress resistance of the plasmon generator 16, it is preferable that the additive amount is 1% or less.

TABLE 1

| Rh additive amount (at %) | Peel strength (mN) |
|---|---|
| 0.0% | 321 |
| 0.6% | 317 |
| 1.0% | 235 |
| 1.5% | 138 |

Figure 6A:
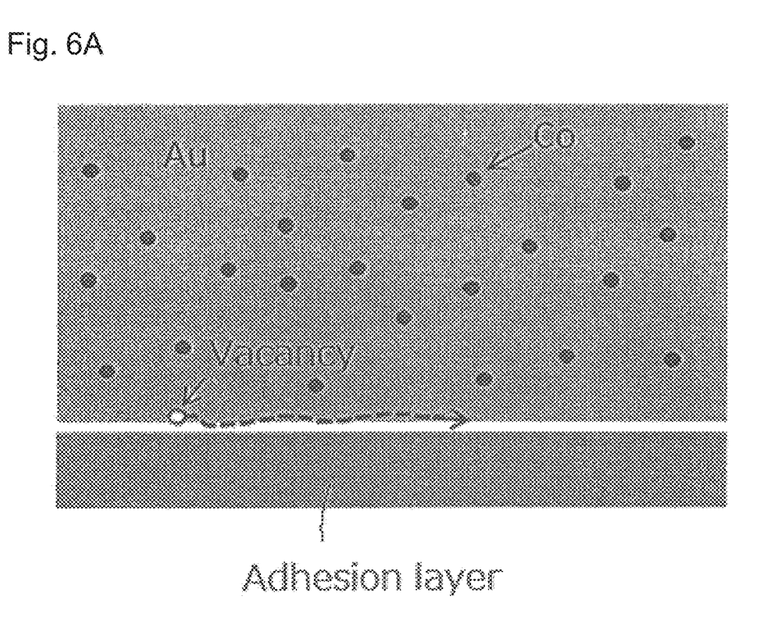
FIG. 6A is a pattern diagram showing movement of atomic vacancies in the plasmon generator before heat treatment.
Figure 6B:
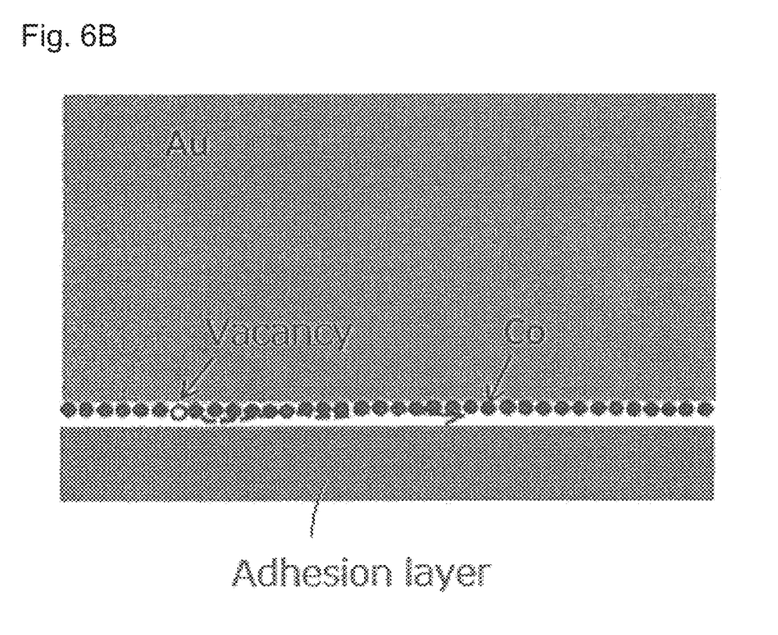
FIG. 6B is a pattern diagram showing movement of atomic vacancies in the plasmon generator after heat treatment.

In the meantime, Table 2 shows a relationship between an additive amount of Co in AuCo and the peel strength, under the similar conditions. In this case, if the Co is added by 1% or less, it becomes ascertained adhesiveness is improved. It is believed that Co mixed into Au contributes to improvement of adhesiveness by precipitating on the interface between the plasmon generator 16 and the adhesion layer 19. For example, in the plasmon generator 16 before heat treatment schematically shown in FIG. 6A, Co is dispersed within Au, and the atomic vacancies can be moved on the interface with the adhesion layer 19 to some degree. A self-diffusion coefficient at 400° C. at this time is $3.4 \times 10^{-23}$ (m²/sec). In the meantime, in the plasmon generator 16 after the heat treatment schematically shown in FIG. 6B, Co aligns on the interface between Au and the adhesion layer, and the movement of the atomic vacancies on the interface is prevented. The self-diffusion coefficient at 400° C. at this time is $6.8 \times 10^{-27}$ (m²/sec).

TABLE 2

| Co additive amount (at %) | Peel strength (mN) |
|---|---|
| 0.0% | 321 |
| 0.6% | 384 |
| 1.0% | 283 |
| 1.5% | 178 |

As shown in FIG. 3, a head protective film (omitted in FIG. 2) so as to cover the air bearing surface S including the front end surface 16a of the plasmon generator 16 and the main pole end surface 10a of the main pole 10 may be provided. The head protective film 20 preferably has heat resistance, translucency and corrosion resistance, and is formed, for example, with TaOx. When Ta or Cr is conventionally used as the adhesion layer, in order to prevent oxidation of the adhesion layer and reduction of the adhesiveness, it is not preferable to use TaOx having oxygen permeability as a head protective film. However, in the present invention, since the adhesion layer 19 is an oxide layer, there is no problem even if the head protective film 20 transmits oxygen. Therefore, in the present invention, there is no possibility to cause adhesiveness reduction in the adhesion layer 19, and the head protective film 20 made from TaOx that excels in heat resistance, translucency and corrosion resistance can be preferably used.

A configuration of the remainder of the thermal assisted magnetic recording head including the plasmon generator 16 and the adhesion layer 19, which have been explained above in detail, is explained. With reference to FIG. 2 again, the laser diode unit 31 is positioned opposite to the surface at the opposite side of the air bearing surface S of the magnetic head slider 2. The laser diode unit 31 emits laser light in the direction z that is perpendicular to the air bearing surface S toward the core 15 of the waveguide path 17 in the magnetic head slider 2. The laser diode unit 31 is soldered to the magnetic head slider 2 by a bonding layer 37.

The laser diode unit 31 includes the laser diode 32, which is a laser light generating element, and a sub-mount 33 where the laser diode 32 is mounted. The laser diode 32 supplies laser light to the core 15. The sub-mount 33 is formed from a Si substrate or the like. The laser diode 32 is mounted to a mounting surface 33a of the sub-mount 33. Specifically, a first electrode (p electrode) 32j of the laser diode 32 is fixed to a pad 41 provided on the mounting surface 33a of the sub-mount 33 with a solder material 42.

The laser diode 32 is an edge emitting type, and materials that are normally used for communication, optical disk storage or material analysis, such as InP-series, GaAs-series or GaN-series, are usable. Although wavelength of the laser light to be radiated is not particularly limited, a wavelength within a range of 375 nm to 1.7 μm is usable, and especially wavelength with approximately 650 nm to 900 nm is preferably used.

The laser diode 32 is not limited to the configuration below; however, one example is a configuration where an n electrode 32a configuring the second electrode, an n-GaAs substrate 32b, an n-InGaAlP clad layer 32c, a first InGaAlP guide layer 32d, an active layer 32e made from multiple quantum well (InGaP/InGaAlP) or the like, a second InGaAlP guide layer 32f, a p-InGaAlP clad layer 32g, a p electrode under layer 32h and a p electrode 32j configuring the first electrode are sequentially laminated. Reflective layers 32k and 32l for exciting oscillation by total reflection are formed in front and behind a cleavage surface of the laser diode 32. A surface of the reflective layer 32k, i.e. a surface opposite to the magnetic head slider 2 of the laser diode 32 configures a light emission surface 32n of the laser diode 32. An emission center 32m exists at a position of the active layer 32e of the reflective layer 32k. The n electrode 32a and the p electrode 32j can be formed with an Au or Au alloy with approximately 0.1 μm of thickness. When a hard disk device is operated, power is fed to the laser diode 32 from a power source within the hard disk device via the first electrode 32j and the second electrode 32a.

Next, a head gimbal assembly (HGA) to which the thermal assisted magnetic recording head is mounted is explained.

Figure 7:
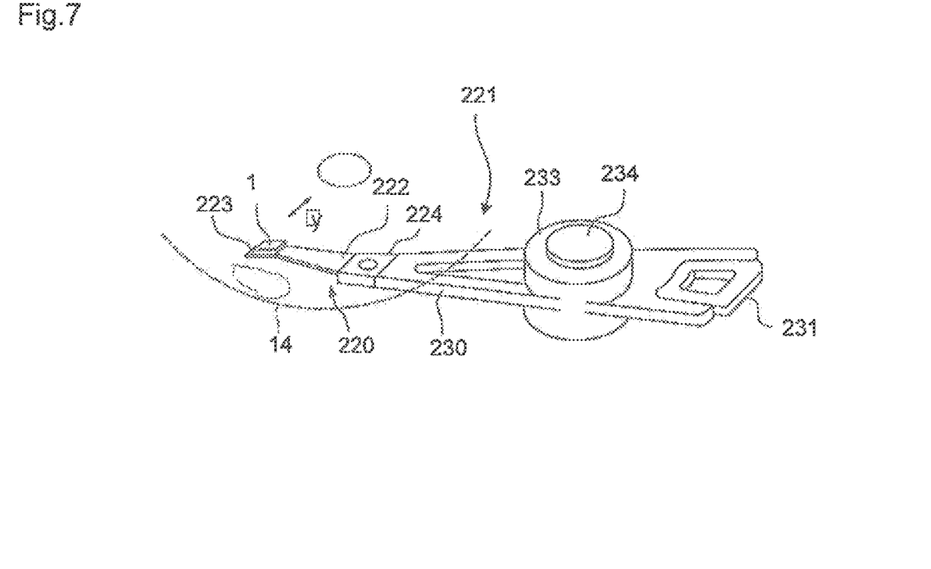
FIG. 7 is a perspective view of a head arm assembly of the present invention.

With reference to FIG. 7, a head gimbal assembly (HGA) 220 includes the thermal assisted magnetic recording head 1 and a suspension 221 that elastically supports the thermal assisted magnetic recording head 1. The suspension 221 has a plate spring-like load beam 222 formed with stainless steel, a flexure 223 provided at one end portion of the load beam 222 and a base plate 224 provided at the other end portion of the load beam 222. The thermal assisted magnetic recording head 1 is joined to the flexure 223 which gives an appropriate degree of freedom to the thermal assisted magnetic recording head 1. A gimbal part for maintaining a posture of the thermal assisted magnetic recording head 1 at a steady level is provided in a portion of the flexure 223 to which the thermal assisted magnetic recording head 1 is mounted.

A member to which the HGA 220 is mounted to an arm 230 is referred to as a head arm assembly 221. The arm 230 moves the thermal assisted magnetic recording head 1 in the cross track direction y of the magnetic recording medium 14. One end of the arm 230 is mounted to the base plate 224. A coil 231 to be a portion of a voice coil motor is mounted to the other end of the arm 230. A bearing part 233 is provided in the intermediate portion of the arm 230. The arm 230 is rotatably supported by a shaft 234 mounted to the bearing part 233. The arm 230 and the voice coil motor that drives the arm 230 configure an actuator.

Figure 8:
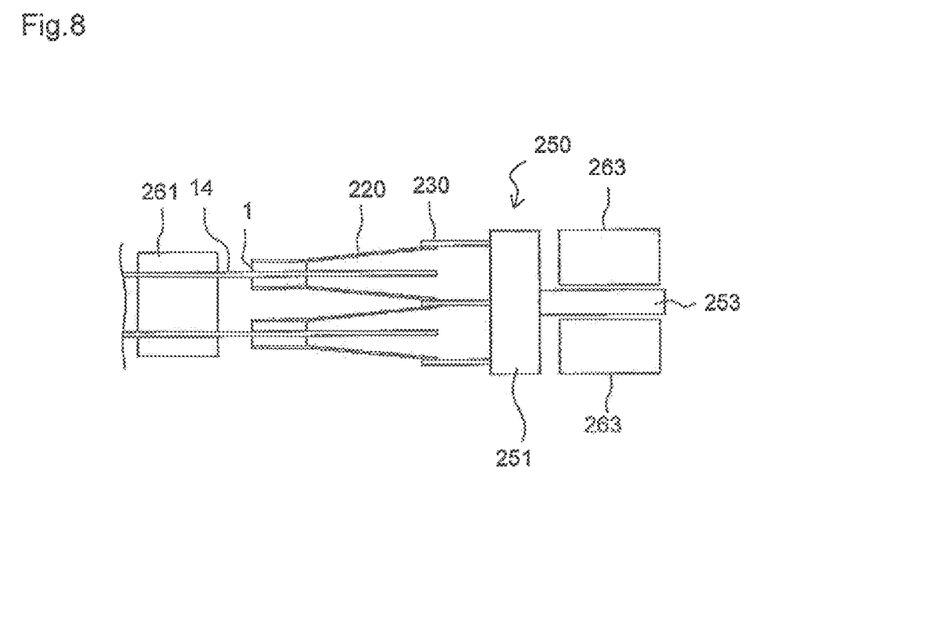
FIG. 8 is a side view of a head stack assembly of the present invention.
Figure 9:
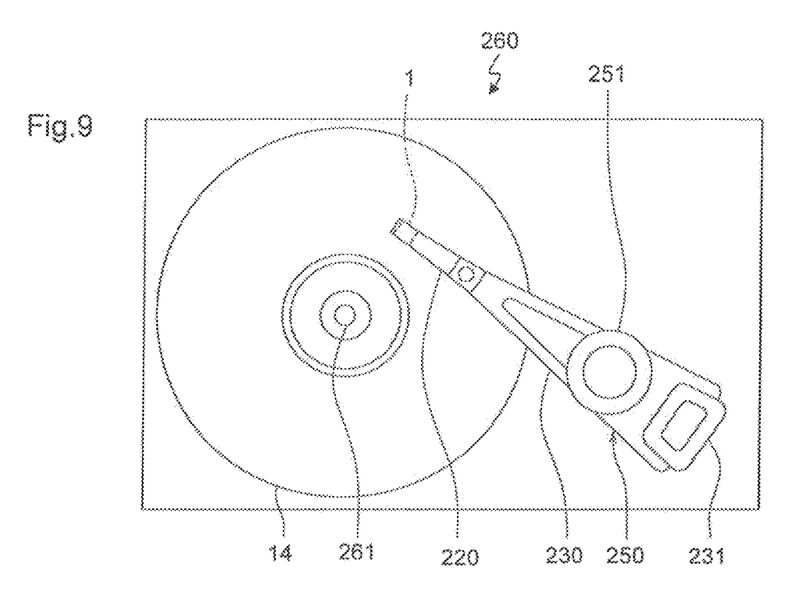
FIG. 9 is a plan view of a magnetic recording apparatus of the present invention.

Next, with reference to FIGS. 8 and 9, a head stack assembly and a magnetic recording apparatus where the thermal assisted magnetic recording head 1 is incorporated are explained. The head stack assembly is a member to which the HGA 220 is mounted to arms of a carriage having a plurality of arms, respectively. FIG. 8 is a side view of the head stack assembly, and FIG. 9 is a plan view of the magnetic recording apparatus. A head stack assembly 250 has a carriage 251 having a plurality of arms 230. The HGA 220 is mounted to each arm 230 at intervals so as to be aligned in the perpendicular direction. A coil 231 to be a portion of the voice coil motor is mounted at the opposite side of the arm 230 in the carriage 251. The voice coil motor has a permanent magnet 263 arranged at an opposite position across the coil 231.

With reference to FIG. 9, the head stack assembly 250 is incorporated into a magnetic recording apparatus 260. The magnetic recording apparatus 260 has a plurality of magnetic recording media 14 mounted to a spindle motor 261. For every magnetic recording medium 14, two thermal assisted magnetic recording heads 1 are arranged so as to be opposite to each other across the magnetic recording media 14. The head stack assembly 250 and the actuator except for the thermal assisted magnetic recording heads 1 correspond to a positioning device, and support the thermal assisted magnetic recording heads 1, and position the thermal assisted magnetic recording heads 1 relative to the magnetic recording media 14. The thermal assisted magnetic recording heads 1 are moved in the cross track direction of the magnetic recording media 14 by the actuator, and are positioned relative to the magnetic recording media 14. The thermal assisted magnetic recording head 1 records information into the magnetic recording media 14 by the magnetic recording element 5, and reproduces the information recorded in the magnetic recording media 14 by the MR element.

The preferred embodiments of the present invention were presented and explained in detail, but it should be understood that various changes and corrections may be made without departing from intent or the scope of the invention or the scope.

What is claimed is:

1. A thermal assisted magnetic recording head that performs magnetic recording while locally heating a magnetic recording medium, comprising:
   a plasmon generator that generates a surface plasmon, and that generates near-field light from the surface plasmon on a front end surface positioned on an air bearing surface opposite to the magnetic recording medium, a dielectric body layer positioned around the plasmon generator, and an adhesion layer positioned between the plasmon generator and the dielectric body layer, wherein:

the adhesion layer is made from at least one of IrOx, RuOx, NiOx and CoOx, the dielectric body layer is made from AlOx or SiOx, and the plasmon generator and the adhesion layer are thermally treated at a temperature of 200° C. or higher.

2. The thermal assisted magnetic recording head according to claim 1, wherein the plasmon generator is made from gold with 99.0% or greater purity.

3. The thermal assisted magnetic recording head according to claim 2, wherein the plasmon generator contains 1% or less of cobalt or rhodium.

4. The thermal assisted magnetic recording head according to claim 1, wherein the plasmon generator is made from AuCo.

5. The thermal assisted magnetic recording head according to claim 1, wherein a head protective film having translucency and oxygen permeability is formed on the air bearing surface.

6. The thermal assisted magnetic recording head according to claim 5, wherein the head protective film is made from TaOx.

7. The thermal assisted magnetic recording head according to claim 1, wherein a film thickness of the adhesion layer is 5 Å or greater.

8. The thermal assisted magnetic recording head according to claim 1, further comprising a main pole having a front end positioned in the vicinity of the plasmon generator on the air bearing surface, the main pole emitting a magnetic flux to the magnetic recording medium.

9. A head gimbal assembly, comprising:

the thermal assisted magnetic recording head according to claim 1, and a suspension that elastically supports the thermal assisted magnetic recording head, wherein the suspension has a flexure to which the thermal assisted magnetic recording head is joined, a load beam with one end connected to the flexure, and a base plate connected to the other end of the load beam.

10. A magnetic recording apparatus, comprising:

the thermal assisted magnetic recording head according to claim 1, the magnetic recording medium positioned opposite to the magnetic head slider, a spindle motor that rotates and drives the magnetic recording medium, and a device that supports the magnetic head slider, and that positions the magnetic head slider relative to the magnetic recording medium.

* * * * *